United States Patent
Chen et al.

(10) Patent No.: US 8,649,278 B2
(45) Date of Patent: Feb. 11, 2014

(54) METHOD AND SYSTEM OF MULTIMEDIA SERVICE PERFORMANCE MONITORING

(75) Inventors: Rui Chen, Guangdong (CN); Zhiying Wang, Guangdong (CN); Ning Wang, Guangdong (CN); Zhijun Dai, Guangdong (CN); Jinian Liu, Guangdong (CN)

(73) Assignee: ZTE Corporation, Shenzhen City, Guangdong Province (CN)

( * ) Notice: Subject to any disclaimer, the term of this patent is extended or adjusted under 35 U.S.C. 154(b) by 824 days.

(21) Appl. No.: 12/447,372

(22) PCT Filed: Nov. 2, 2007

(86) PCT No.: PCT/CN2007/003117
§ 371 (c)(1),
(2), (4) Date: Apr. 27, 2009

(87) PCT Pub. No.: WO2000/052443
PCT Pub. Date: May 8, 2008

(65) Prior Publication Data
US 2010/0074126 A1    Mar. 25, 2010

(30) Foreign Application Priority Data
Nov. 3, 2006  (CN) .......................... 2006 1 0138305

(51) Int. Cl.
*H04L 12/26* (2006.01)
(52) U.S. Cl.
USPC ........... 370/252; 370/241; 370/394; 375/240; 375/240.16; 709/231; 709/246; 709/247
(58) Field of Classification Search
USPC ............. 370/241, 252, 394; 375/240, 240.16, 375/240.24; 709/231, 246, 247
See application file for complete search history.

(56) References Cited

U.S. PATENT DOCUMENTS

| | | | |
|---|---|---|---|
| 5,262,964 A | 11/1993 | Bonsall et al. | |
| 2003/0046384 A1 | 3/2003 | Sirivara | |
| 2005/0169182 A1 | 8/2005 | Klink | |
| 2006/0153174 A1 | 7/2006 | Towns-von Stauber et al. | |
| 2006/0245428 A1* | 11/2006 | Yanamoto et al. ............ | 370/394 |

FOREIGN PATENT DOCUMENTS

| | | |
|---|---|---|
| CN | 1859584 A | 11/2006 |
| EP | 1450514 A1 | 8/2004 |
| WO | 03094442 A1 | 11/2003 |

OTHER PUBLICATIONS

International Search Report Issued Mar. 6, 2008 for PCT/CN2007/003117 (WO2008/052443 A1).

(Continued)

*Primary Examiner* — Nicholas Sloms
(74) *Attorney, Agent, or Firm* — Banner & Witcoff, Ltd.

(57) ABSTRACT

A method and system of multimedia service performance monitoring is provided. The method comprises the following steps: (a) a reference point acquires and stores the association relationship between multimedia packet identification number and the corresponding multimedia information; (b) a sample point orders the received packets according to the multimedia packet identification numbers, detects the integrality of the packets, and feeds the identification numbers of the lost multimedia packets back to the reference point if there are lost packets; (c) the reference point obtains the corresponding multimedia information according to the identification numbers of the lost multimedia packets returned by the sample point and the stored association relationship between the multimedia packet identification number and the corresponding multimedia information, and then evaluates the multimedia service quality of the sample point.

13 Claims, 4 Drawing Sheets

(56) References Cited

OTHER PUBLICATIONS

Friedman, T., et al.: "RTP Control Protocol Extended Reports (RTCP XR); rfc3611.txt" IETF Standard, Internet Engineering Task Force (Nov. 1, 2003).

Supplementary European Search Report issued in corresponding European patent application, Application No. EP 07816730.1, on Aug. 5, 2010.

* cited by examiner

| RTP packet number | Image frame sequence number | Macro-block 1 start | Macro-block 1 end | Motion vector | Macro-block 2 start | Macro-block 2 end | Motion vector |
|---|---|---|---|---|---|---|---|
| Packet No.1 | Video frame No. | Start macro-block No.1 | End macro-block No.1 | Motion Vectors | Start macro-block No.2 | End macro-block No.2 | Motion Vectors |
| Packet No.2 | Video frame No. | Start macro-block No.1 | End macro-block No.1 | Motion Vectors | Start macro-block No.2 | End macro-block No.2 | Motion Vectors |
| Packet No.3 | Video frame No. | Start macro-block No.1 | End macro-block No.1 | Motion Vectors | Start macro-block No.2 | End macro-block No.2 | Motion Vectors |

FIG. 4

METHOD AND SYSTEM OF MULTIMEDIA SERVICE PERFORMANCE MONITORING

TECHNICAL FIELD

The present invention relates to multimedia information transmission and processing, and more particularly to a method and system of multimedia service performance monitoring.

TECHNICAL BACKGROUND

With the rapid development and popularization of wired network and wireless network, multimedia application gets more and more attention under the promotion of huge user requirements and is considered as one of the mainstream applications of high speed network in the future. Compared with the traditional application of Internet, such as World Wide Web (WWW), electrical mail (E-mail), etc., the multimedia application including video application and audio application has a greater need for broadband, and compressing multimedia data before network transmission has become a very important step. The existing multimedia data transmission such as video and audio data transmission uses coding technologies with high compression ratio. These coding technologies compress data using the correlation of multimedia information such as video and audio in time, space and statistical domain. Therefore, the loss or delay of multimedia packets during network transmission process will result in decrease in the playback quality of video and audio at a receiving end (encoder). However, the existing wired or wireless network does not provide the guarantee for quality of services (QoS) of transmission, so the loss or delay of multimedia packets is inevitable, which will result in decrease in the user experience quality. In order to improve the multimedia service quality, monitoring the quality of multimedia information transmitted by wired network or wireless network has become a research hotspot in the fields of the multimedia application.

The traditional method of multimedia service performance monitoring includes monitoring multimedia information received at the receiving end, detecting error information of multimedia data during network transmission process by decoding the multimedia data, and feeding the error information back to a server used for monitoring the multimedia service performance. The multimedia data from the receiving end are reconstructed based on the received error information of the multimedia data at the server, thereby monitoring and evaluating the multimedia service performance of the receiving end.

FIG. 1 is a schematic view of a multimedia service performance monitoring system in prior art. As shown in FIG. 1, a transmitting end packets multimedia data and transmits them to a receiving end through a plurality of network nodes. Multimedia packets can be delayed or lost during transmission process of the multimedia data, and thus the receiving end cannot receive correctly some packets. At this time, the receiving end finds error information in multimedia content by multimedia decoding processing and feeds back the error information to a quality monitoring server. The quality monitoring server estimates the multimedia data received by the monitored receiving end based on the received error information of the multimedia data using a multimedia decoder. The multimedia data received by the monitored receiving end are compared with reference multimedia data to achieve the monitoring of multimedia service performance.

One disadvantage of the traditional method of multimedia service performance monitoring is that the error information in the multimedia content can only be obtained through the processing by the multimedia decoder of the receiving end, and the quality of the received image is evaluated according to the error information. This requires that the monitored receiving end can decode completely the transmitted multimedia information. When the performance of a plurality of multimedia services is needed to be monitored, the method used by the traditional multimedia service performance monitoring system as shown in FIG. 1 requires that the receiving end can decode the content of a plurality of multimedia services. This increases resource consumption at the receiving end and is unfavorable to digital copyright management of multimedia content.

Another disadvantage of the traditional method of multimedia service performance monitoring is that the sent image data must be decoded by the multimedia decoder of the quality monitoring server to estimate the multimedia content at the monitored receiving end. This requires that the server performs decoding operation on multimedia at each monitored receiving end. When multimedia service performance at a plurality of receiving ends is needed to be monitored, the method used by the traditional multimedia service performance monitoring system as shown in FIG. 1 requires that the server decodes the contents of the multimedia services for a plurality of receiving ends. This greatly increases resource consumption at the server.

SUMMARY OF THE INVENTION

A technical problem solved by the present invention is to provide a method and system of multimedia service performance monitoring, without decoding multimedia data at a monitored receiving end and a quality monitoring server.

In order to solve the technical problem described above, the present invention provides a method of multimedia service performance monitoring, wherein the method is applied to a system including a transmitting end, a receiving end and intermediate network transmission nodes and comprises the following steps:

(a) a reference point acquires and stores the association relationship between multimedia packet identification number and the corresponding multimedia information;

(b) a sample point orders the received packets according to the multimedia packet identification numbers, detects the integrality of the packets, and feeds the identification numbers of the lost multimedia packets back to the reference point if there are the lost packets;

(c) the reference point obtains the corresponding multimedia information according to the identification numbers of the lost packets returned by the sample point and the stored association relationship between the multimedia packet identification number and the corresponding multimedia information, and then evaluates the multimedia service quality of the sample point.

Further, the method comprises the following step before the step (a):

(a1) setting the reference point and the sample point in the system, wherein the reference point can obtain a complete copy of multimedia data sent by a transmitting end, the sample point is located at any network node which needs to monitor service, and there is a bidirectional communication channel between the reference point and the sample point.

Further, in the step (a), the multimedia packet identification numbers are sequence numbers when sending the coded multimedia data information.

Further, in the step (a), the multimedia information is multimedia data information corresponding to the packet identification numbers, or characteristic information extracted from multimedia data, or compression coding information of multimedia data.

Further, the reference point is located at the transmitting end. In the step (a), the reference point obtains the complete copy of the uncoded data sent to the reference point by the transmitting end, while the transmitting end transmits the association relationship between the multimedia packet identification number and the corresponding multimedia information to the reference point.

Further, the reference point is located at the network transmission nodes and establishes a reliable connection with the transmitting end. In the step (a), the reference point receives and decodes a complete copy of the coded data sent by the transmitting end, and obtains the association relationship between the multimedia packet identification number and the corresponding multimedia information by creating an index between the multimedia packet identification numbers and the corresponding multimedia information.

Further, the association relationship between the multimedia packet identification number and the corresponding multimedia information is created by way of index.

Further, one record of the index comprises a Real-time Transport Protocol (RTP) packet number, followed by a video frame sequence number, a macro-block sequence number and position, and a motion vector of each macro-block; or it comprises a plurality of image frame sequence numbers, a macro-block sequence number and position, and a motion vector of each macro-block.

Further, in the step (c), a method for evaluating the multimedia service quality comprises searching the association relationship between the multimedia packet identification number and the corresponding multimedia information according to the identification numbers of the lost packets fed back by the sample point to obtain a position of the lost video data, then estimating video data of the monitored sample point according to the position of the lost video data, and comparing the video data of the monitored sample point with reference video data to obtain the evaluation result of video service quality for the sample point.

The present invention also provides a multimedia service performance monitoring system comprising a transmitting end, a receiving end and intermediate network transmission nodes, wherein the system further comprises a reference point and a sample point, the sample point is located at any network node which needs to monitor service, and there is a bidirectional communication channel between the reference point and the sample point.

Furthermore, the reference point is used for acquiring and storing the association relationship between multimedia packet identification number and the corresponding multimedia information, searching the stored association relationship between the multimedia packet identification number and the corresponding multimedia information to obtain the corresponding multimedia information after receiving sequence numbers of the lost packets sent by the sample point, and then evaluating the multimedia service quality for the sample point.

The sample point are used for ordering the received packets according to the packet identification numbers, detecting the integrality of the packets, and feeding the identification numbers of the lost packets back to the reference point if there are lost packets.

Further, the reference point is located at the transmitting end in the multimedia system and obtains the complete uncoded data transmitted to the reference point by the transmitting end. The association relationship between the multimedia packet identification number and the corresponding multimedia information is also transmitted to the reference point by the transmitting end.

Further, the reference point is located at the intermediate network transmission nodes and establishes a reliable connection with the transmitting end. The reference point receives and decodes the complete coded packets sent by the transmitting end, and obtains the association relationship between the multimedia packet identification number and the corresponding multimedia information by creating an index between the multimedia packet identification numbers and the corresponding multimedia information.

Further, in some embodiments there are one or more reference points, and each reference point is connected with one or more sample points to form a monitoring subsystem.

Further, the reference point searches the association relationship between the multimedia packet identification number and the corresponding multimedia information according to the identification numbers of the lost packets fed back by the sample point to obtain a position of the lost video data, then estimates video data of the monitored sample point according to the position of the lost video data, and compares the video data of the monitored sample point with reference video data to obtain the evaluation result of video service quality for the sample point.

On the one hand, the system and method of multimedia service performance monitoring provided by the present invention can monitor the transmission quality of multimedia information according to packet status information during transmission process, thereby avoiding the process of decoding multimedia at the monitored receiving end and being beneficial to digital copyright management; on the other hand, the association relationship between the sent packet numbers and the multimedia data is established at the server, thereby avoiding the extra process of decoding multimedia in the server and being beneficial to monitor the multimedia service performance for a plurality of receiving ends at the server.

BRIEF DESCRIPTION OF THE DRAWINGS

FIG. 4 is a schematic view of a method for creating an index between the packet identification numbers and the coded video information.

PREFERRED EMBODIMENTS OF THE INVENTION

The basic idea of the present invention is to generate an association relationship table of the multimedia packet identification number and the corresponding multimedia information (which hereinafter is called as a packet multimedia information table for short or an index of the multimedia packet identification numbers and the multimedia information), search in the association relationship table according to the identification numbers of the lost packets to obtain multimedia data or multimedia characteristic information corresponding to the identification numbers of the lost packets, thus monitoring and evaluating multimedia service performance and service quality.

The present invention will be described in detail below in conjunction with the accompany drawings and embodiments.

The following embodiments take the typical monitoring of multimedia video service performance as an example to illustrate the principle and implementation method of the multimedia service performance monitoring according to the present invention, however the present invention is not limited to this application.

Figure 2:
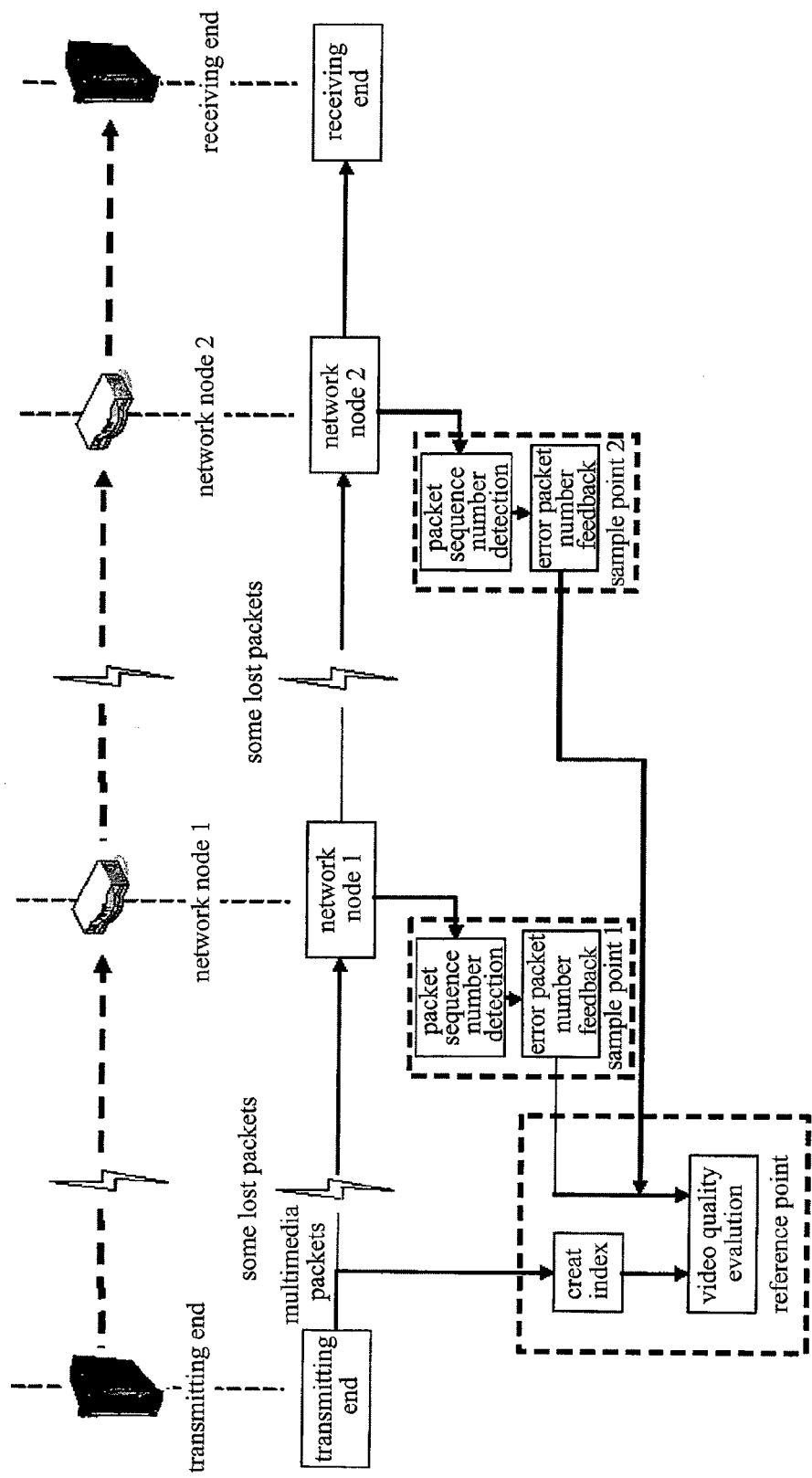
FIG. 2 is a schematic view of a multimedia service performance monitoring system based on feedback information according to the present invention.

FIG. 2 shows a schematic view of a multimedia service performance monitoring system based on feedback information according to the present invention. The system includes a sample point and a reference point in addition to a transmitting end, network nodes (network node 1 and network node 2) and a receiving end.

Figure 1:
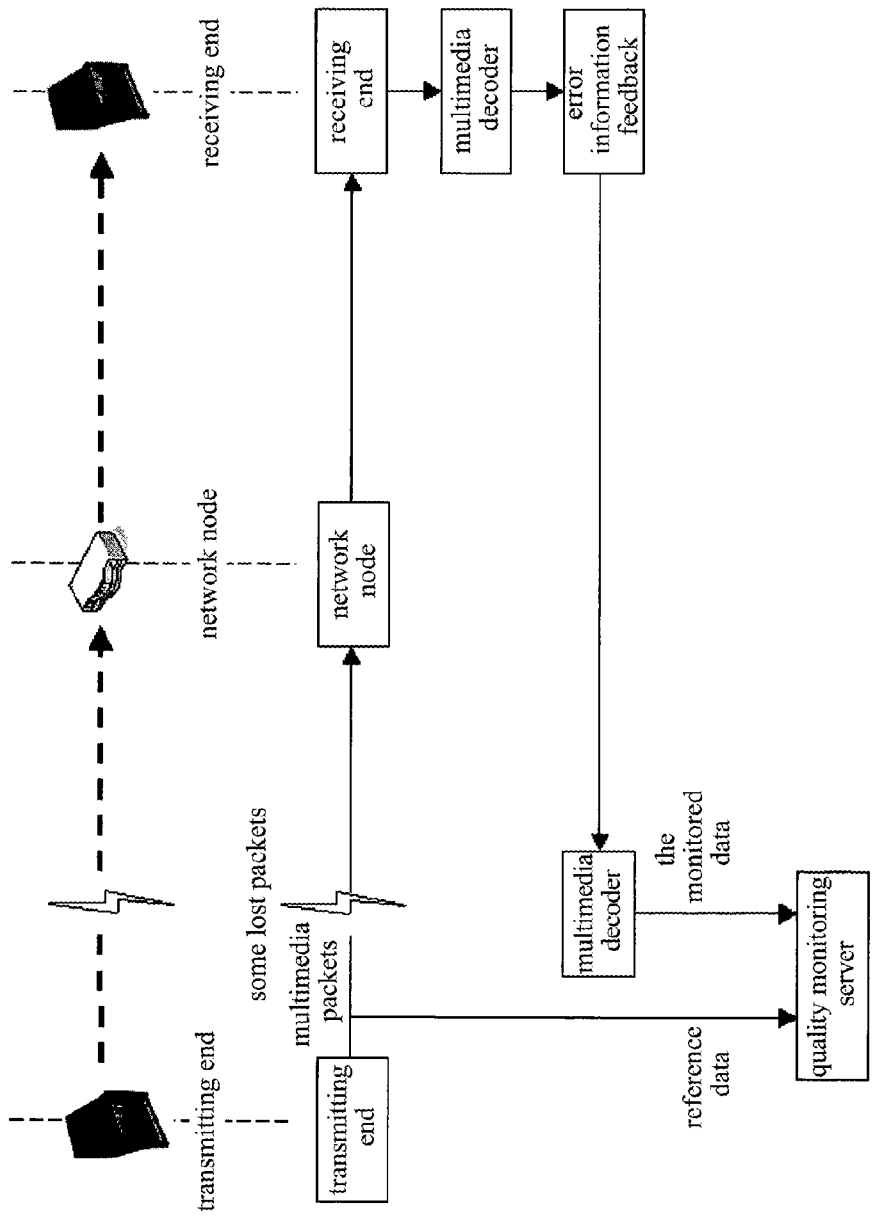
FIG. 1 is a schematic view of a multimedia service performance monitoring system in prior art.

In this embodiment, the reference point is located at the transmitting end in the multimedia system (the transmitting end herein includes an encoder). In other embodiments, the reference point can be located at the network nodes between the transmitting end and the receiving end. The reference point corresponds to the quality monitoring server in FIG. 1.

The reference point is used for obtaining a complete copy of multimedia data sent by the transmitting end and establishing the packet multimedia information table. In addition, the reference point is also used for receiving feedback information of the identification numbers of the lost packets sent by the sample point, and searching in the packet multimedia information table according to the feedback information to obtain the corresponding multimedia data or characteristic information, thereby monitoring the multimedia service performance and evaluating the multimedia service quality.

In the embodiment, the above described association relationship table of the multimedia packet identification number and the corresponding multimedia information is an association relationship table indexed by the multimedia packet identification numbers The sample point is a device for detecting the integrality of the identification number of the received packet, determining whether there are the lost packets, and transmitting the identification numbers of the lost packets to the reference point through a feedback channel between the sample point and the reference point.

Furthermore, the sample point can be located at any network node which is needed to monitor the multimedia service performance. In the embodiment shown in FIG. 2, sample point 1 and sample point 2 are set in network node 1 and network node 2 respectively. Certainly, the sample point can be also set in the receiving end.

The embodiment shown in FIG. 2 includes one reference point located in the transmitting end. There is a bidirectional communication channel between the reference point and its two corresponding sample points.

Figure 3:
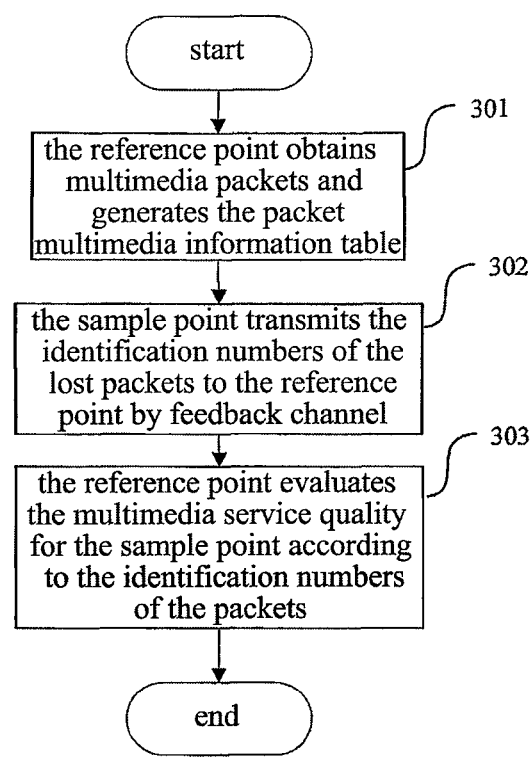
FIG. 3 is a flowchart of a method of multimedia service performance monitoring according to the present invention.

FIG. 3 is a flowchart of a method of multimedia service performance monitoring according to the present invention. Multimedia data is packed at the tramsmitting end and transmitted to the receiving end through the network nodes between the transmitting end and the receiving end. If data transmission network cannot guarantee the service quality, then the multimedia data received by the receiving end may be inconsistent with the data sent by the transmitting end, that is, packet loss exists.

In the multimedia service performance monitoring system shown in FIG. 2, the packet loss exists both between the transmitting end and network node 1 and between network node 1 and network node 2. In order to achieve the monitoring of multimedia video service performance, the method of multimedia service performance monitoring according to the present invention includes the following steps:

step 301: the transmitting end copies the packets to be sent and transmits them to the reference point, the reference point obtains complete multimedia packets (called as packets in short) sent by the transmitting end, and establishes and stores the association relationship between multimedia information;

The association relationship described above is a multimedia information association relationship table including the multimedia packet identification numbers (called as packet identification numbers for short) and the corresponding multimedia information, that is, the multimedia information association relation table is created by way of index;

In the first embodiment according to the present invention, the reference point is located at the transmitting end, that is, the reference point and the transmitting end exist in the same network element, and there is a direct data connection pathway between them, so data can be transmitted without through network connection. Thus, the transmitting end can transmit the uncoded data directly to the reference point, while the transmitting end transmits the sent multimedia packet identification numbers and the corresponding multimedia information to the reference point to create the packet multimedia information table.

In anther embodiment, when the reference point is located at the network node between the transmitting end and the receiving end, the reference point can establish a reliable network connection with the transmitting end, receive and decode the coded packets sent by the transmitting end, and create the packet multimedia information table. The reliable connection can be a dedicated transmission channel or the transmission channel which uses reliable transmission protocol, such as TCP/IP protocol.

For the two case described above, the reference point obtains the complete copy of data of the transmitting end by connecting with the transmitting end.

The multimedia packet identification numbers in the packet multimedia information table are sequence numbers by which the coded multimedia packets are transmitted. When using RTP protocol, the packet identification numbers are RTP packet sequence numbers; when using TCP/IP protocol, the packet identification numbers are IP packet sequence numbers; and when using H.324M protocol, the packet identification numbers are data frame sequence numbers.

The multimedia information used for creating the packet multimedia information table comprises multimedia data information corresponding to the packets, or characteristic information extracted from multimedia data, or compression coding information of the multimedia data.

There are various association methods of the packet identification numbers and the multimedia information in the packet multimedia information table. For example, if we need to monitor the video service quality, we can establish the association relationship between the packet identification numbers and the video information using a data structure shown in FIG. 4. However the present invention is not limited to the data structure. One record in the packet multimedia information table as shown in FIG. 4 comprises a RTP packet number (packet identification number), followed by an image frame sequence number, sequence number and position of a macro-block, and a motion vector of each macro-block. If there are a plurality of image frames in one RTP packet, then the record comprises the sequence numbers of the plurality of image frames, sequence number and position of a macro-block, and the motion vector of each macro-block.

That is to say, the multimedia information described above comprises an image frame sequence number, a macro-block start position, a macro-block end position and motion vector of a macro-block.

Wherein, the sequence numbers of image frames are sequence numbers in the time axis when displaying video images. One packet can include a plurality of image frame data.

The macro-block start position and macro-block end position represent the spatial position of the macro-block in image frames. One frame can include a plurality of macro-blocks.

The motion vector is a parameter used in coding process. One macro-block can include a plurality of macro-blocks. The motion vector can be used to simulate error correction effect of a decoder when packet loss occurs, thereby evaluating more precisely the video service quality.

One packet has many frame sequence numbers, each frame has many macro-blocks, and each macro-block has one or more motion vectors.

The multimedia information can also include characteristic information of multimedia images corresponding to the packets, such as boundary information of an image region corresponding to the packets, blur metric, etc. The characteristic information described above can be used to evaluate more precisely the multimedia video service quality.

Step 302: each sample point orders the packets received by the corresponding network nodes according to the multimedia packet identification numbers, detects the integrality of the packets, and feeds the identification numbers of the lost packets back to the reference point if there are the lost packets;

Only the integrality of the packet identification numbers, such as the integrality of the RTP packet sequence numbers, needs to be detected at the network node (the sample point) to determine whether packet loss occurs according to the detected result. Only the sequence numbers of the lost packets needs to be detected and processed without decoding and processing the multimedia for the packets at the sample point, and error information is sent to the reference point to evaluate and monitor the service quality.

Since the multimedia needs not to be decoded and processed at the sample point, on the one hand, the versatility for detecting the error information is improved, various multimedia coding standards are not involved, and the implementation complexity of the sample point is decreased; on the other hand, the reliability of digital copyright management of multimedia content is improved, without decrypting and authenticating at the sample point.

Step 303: after the reference point receives the packet identification numbers of the lost packets returned by the sample point, it searches in the packet multimedia information table according to the packet identification numbers to obtain the corresponding multimedia information such as multimedia data and characteristic information corresponding to the packets, and then evaluating the multimedia service quality for the sample point.

When the multimedia service quality for the sample point is monitored at the reference point, retrieving can be performed in the packet multimedia information table to obtain the multimedia information or characteristic information corresponding to the packets by directly using the packet identification numbers. Therefore the extra process of decoding multimedia at the reference point is no longer needed, thereby decreasing resource consumption and being beneficial to monitor the multimedia service performance for a plurality of sample points at the reference point.

In the multimedia service performance monitoring system shown in FIG. 2, the reference point receives feedback information of the lost packets sent by sample point 1 and sample point 2, such as the lost RTP packet numbers. After the feedback information is received, the video service qualities at sample point 1 and sample point 2 can be evaluated respectively according to the feedback information, without decoding and processing video.

The method for evaluating the video service quality for sample point 1 includes retrieving a position corresponding to the lost packets in an original image in the packet multimedia information table according to the lost RTP packet numbers fed back by sample point 1, and estimating video data received actually by the monitored sample point 1 according to the position, for example, all the video data in the corresponding position can be set as 0 or other values, or the video data can be replaced by the values in the corresponding position of the previous image frame, and comparing this received video data with reference video data (i.e., the video data sent by the transmitting end) to obtain the evaluation result of the video service quality for sample point 2.

The method for evaluating the video service quality for sample point 2 includes retrieving a position corresponding to the lost packets in the original image in the packet multimedia information table according to the lost RTP packet numbers fed back by sample point 2, and estimating the video data received actually by the monitored sample point 2 according to the position, and comparing this received video data with the reference video data to obtain the evaluation result of the video service quality for sample point 2.

If the packet multimedia information table uses the data structure as shown in FIG. 4, then the step of retrieving the position corresponding to the lost packets in the original image in the packet multimedia information table according to the RTP packet numbers can be performed by the following method: obtaining the corresponding macro-block start position and macro-block end position according to the RTP packet number (the packet identification numbers of the lost packet), and obtaining the position (X and Y coordinates) corresponding to the video data in the packets in the original image according to values of the macro-block start position and macro-block end position.

However, according to the present invention, the method for evaluating the video service quality is not limited to the way described above. If the monitored video data needs not to be compared with the reference video data copied by the transmitting end when the video service quality is evaluated, then the transmitting end may not copy the video data sent by it to the reference point.

That is to say, the reference point only uses the packet multimedia information table to evaluate preliminarily the video service quality for the sample point, for example, calculating the percent of error image region, etc. If it is needed to evaluate more precisely and finely the video service quality, then the coded or the uncoded video data of the transmitting end is needed to be stored.

In another embodiment, a plurality of reference points can be set in the system, and a communication channel is established between each reference point and one or more sample points corresponding to the reference point, thereby forming a plurality of monitoring subsystems which are the same as the embodiments described above.

INDUSTRIAL APPLICABILITY

By using the method and system of multimedia service performance monitoring according to the present invention, the receiving end and the network nodes need not to decode the received multimedia packets, thereby saving resource consumption of software and hardware at the receiving end and the network nodes, being beneficial to monitor the multimedia service performance for a plurality of sample points at the reference point, and being beneficial for digital copyright management of multimedia content, without decrypting and authenticating at the sample points.

What is claimed is:

1. A method of multimedia service performance monitoring applied to a system including a transmitting end, a receiving end and intermediate network transmission nodes, comprising the following steps:
   (a) a reference point acquiring and storing an association relationship between a multimedia packet identification number and corresponding multimedia information, wherein the corresponding multimedia information is multimedia data information corresponding to the multimedia packet identification numbers, or characteristic information extracted from multimedia data, or compression coding information of multimedia data, and wherein the corresponding multimedia information includes an image frame sequence number, a macro-block start position a macro-block end position and a motion vector of a macro-block;
   (b) a sample point ordering received packets according to the multimedia packet identification numbers, detecting integrality of the packets, and if there are lost packets, feeding their multimedia packet identification numbers back to the reference point; and
   (c) the reference point obtaining the corresponding multimedia information according to the identification numbers of the lost multimedia packets returned by the sample point and the stored association relationship between the multimedia packet identification number and the corresponding multimedia information without decoding the corresponding multimedia information at the reference point, and then evaluating multimedia service quality of the sample point.

2. The method according to claim 1, comprising the following step before the step (a):
   (a1) setting the reference point and the sample point in the system, wherein the reference point obtains a complete copy of multimedia data sent by a transmitting end, the sample point is located at any network node which needs to be monitored for service, and there is a bidirectional communication channel between the reference point and the sample point.

3. The method according to claim 1, wherein in the step (a), the multimedia packet identification numbers are sequence numbers when sending coded multimedia data information.

4. The method according to claim 1, wherein the reference point is located at the transmitting end, and in the step (a), the reference point obtains a complete copy of the uncoded multimedia data sent to the reference point by the transmitting end, and meanwhile the transmitting end transmits the association relationship between the multimedia packet identification number and the corresponding multimedia information to the reference point.

5. The method according to claim 1, wherein the reference point is located at the network transmission nodes and establishes a reliable connection with the transmitting end, and in the step (a), the reference point receives and decodes the complete copy of the coded multimedia data sent by the transmitting end, and obtains the association relationship between the multimedia packet identification number and the corresponding multimedia information by creating an index between the multimedia packet identification numbers and the corresponding multimedia information.

6. The method according to claim 1, wherein the association relationship between the multimedia packet identification number and the corresponding multimedia information is created by way of index.

7. The method according to claim 6, wherein one record of the index comprises a Real-time Transport Protocol packet number, followed by a video frame sequence number, a macro-block sequence number and position, and a motion vector of each macro-block; or the record comprises a plurality of image frame sequence numbers, a macro-block sequence number and position, and a motion vector of each macro-block.

8. The method according to claim 1, wherein in the step (c), a method for evaluating the multimedia service quality comprises searching the association relationship between the multimedia packet identification number and the corresponding multimedia information according to the identification numbers of the lost packets fed back by the sample point to obtain a position of the lost video data, then estimating video data of the monitored sample point according to the position of the lost video data, and comparing the video data of the monitored sample point with reference video data to obtain the evaluation result of video service quality for the sample point.

9. A multimedia service performance monitoring system comprising a transmitting end, a receiving end and intermediate network transmission nodes, wherein the system further comprises a reference point and a sample point, the sample point is located at any network node which needs to be monitored for service, and there is a bidirectional communication channel between the reference point and the sample point, wherein:
   the reference point is configured to acquire and store an association relationship between multimedia packet identification number and corresponding multimedia information, search the stored association relationship between the multimedia packet identification number and the corresponding multimedia information to obtain the corresponding multimedia information after receiving sequence numbers of the lost packets sent by the sample point without decoding the corresponding multimedia information at the reference point, and then evaluate the multimedia service quality for the sample point, wherein the corresponding multimedia information is multimedia data information corresponding to the multimedia packet identification numbers, or characteristic information extracted from multimedia data, or compression coding information of multimedia data, and wherein the corresponding multimedia information includes an image frame sequence number, a macro-block start position, a macro-block end position and a motion vector of a macro-block; and
   the sample point is configured to order received packets according to the multimedia packet identification numbers, detect integrality of the packets, and feed the identification numbers of the lost packets back to the reference point if there are lost packets.

10. The system according to claim 9, wherein the reference point is located at the transmitting end in the multimedia system and is configured to obtain the complete uncoded data transmitted to the reference point by the transmitting end, and wherein the association relationship between the multimedia packet identification number and the corresponding multimedia information is also transmitted to the reference point by the transmitting end.

11. The system according to claim 9, wherein the reference point is located at the intermediate network transmission node and is configured to establish a reliable connection with the transmitting end, and the reference point is configured to receive and decode the complete coded packets sent by the transmitting end, and obtain the association relationship between the multimedia packet identification number and the corresponding multimedia information by creating an index between the multimedia packet identification numbers and the corresponding multimedia information.

12. The system according to claim 9, wherein there are one or more reference points, and each reference point is connected with one or more sample points to form a monitoring subsystem.

13. The system according to claim 9, wherein the reference point is configured to search the association relationship between the multimedia packet identification number and the corresponding multimedia information according to the identification numbers of the lost packets fed back by the sample point to obtain a position of the lost video data, then estimate video data of the monitored sample point according to the position of the lost video data, and compare the video data of the monitored sample point with reference video data to obtain the evaluation result of video service quality for the sample point.

\* \* \* \* \*

UNITED STATES PATENT AND TRADEMARK OFFICE
CERTIFICATE OF CORRECTION

PATENT NO.        : 8,649,278 B2                              Page 1 of 1
APPLICATION NO.   : 12/447372
DATED             : February 11, 2014
INVENTOR(S)       : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 823 days.

Signed and Sealed this
Twenty-ninth Day of September, 2015

Michelle K. Lee
*Director of the United States Patent and Trademark Office*